W. Watts,
Steam Pump.

N° 39,852. Patented Sep. 8, 1863.

Witnesses:
Sarah D. Tompkins
Daniel F. Tompkins

Inventor:
William Watts

UNITED STATES PATENT OFFICE.

WILLIAM WATTS, OF NEWARK, NEW JERSEY.

IMPROVEMENT IN STEAM-PUMPS.

Specification forming part of Letters Patent No. 39,852, dated September 8, 1863.

*To all whom it may concern:*

Be it known that I, WILLIAM WATTS, of the city of Newark, in the county of Essex and State of New Jersey, have invented certain new and useful Improvements in Steam-Pumps; and I do hereby declare that the following is a full, clear, and exact description of the same, reference being had to the accompanying drawings, making a part of this specification, in which—

Figure 1:
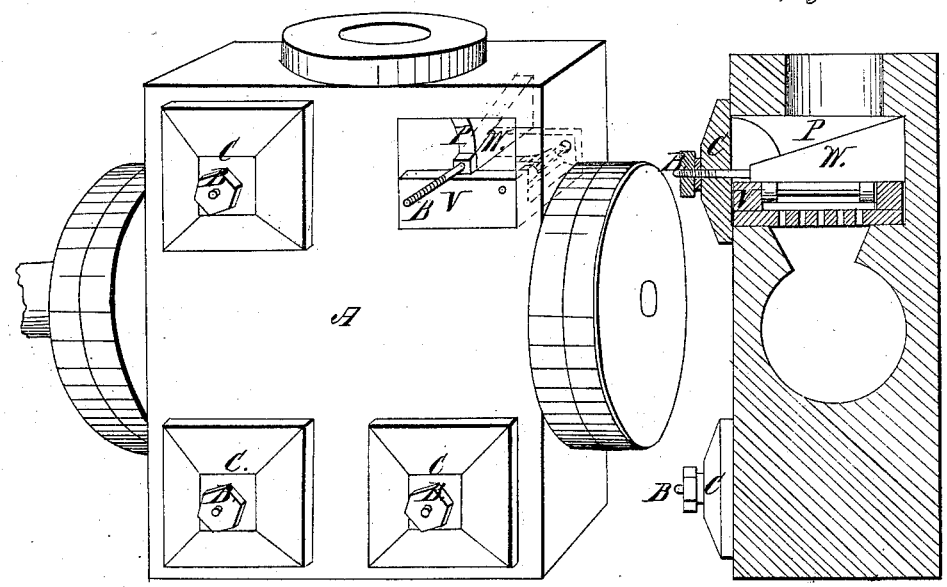
Figure 2:
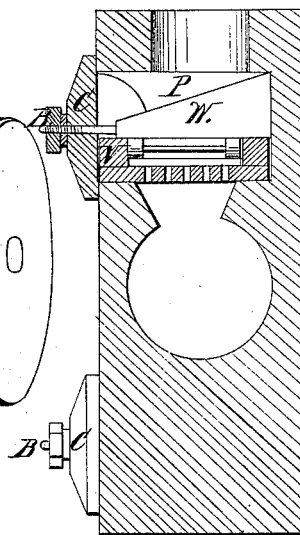
Figure 3:
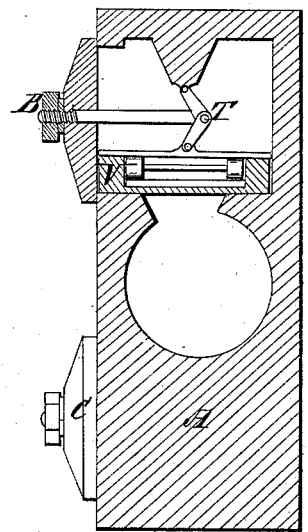

Figure 1 is a perspective view of the pumping-cylinder of a steam-pump, with the valves attached thereto, the cap of one of the valves being removed in order to show my improvement therein. Fig. 2 is a longitudinal vertical section of my said improvement; and Fig. 3 is also a longitudinal section of my said improvement, showing a different but equivalent form of device to accomplish the same results as in Figs. 1 and 2.

The same letters indicate like parts in all the figures.

It is well known that most, if not all, the steam-pumps in use are quite complicated as to the arrangement of their valves, and that there is not one in use in which worn or defective valves can be cheaply and readily repaired or replaced.

A steam-pump, of all devices, should be simple of construction, and the valves not liable to defects or disarrangements, and when choked or worn should admit of immediate access and replacement, if necessary. Their employment on ships, as in the recent sad case of the Monitor and Passaic, the first of which foundered at sea, and the latter, it is reported, at one time threatened inevitable abandonment on account of the choking of the pump-valves, sufficiently attests the necessity of the simplicity and access of and to the valves above referred to.

In the figures, A is the main body of the pump.

B B B B are bolts, which secure the caps C C C C to each of the four valve-chambers, as shown.

V, Figs. 1, 2, and 3, is the valve-seat. It is constructed in any convenient manner to contain either a metal-hinge valve, as shown in the figures, or a rubber-hinge valve, or one or more round disks, leather or rubber valves. The valve seat V is formed to fit nicely into the valve-chamber, and when the cap C and bolt B, with its accompanying wedge W, is removed, said valve-seat may be instantly slid into or out from its place in the said chamber. The wedge W, Figs. 1 and 2, rests upon the said valve-seat, as shown, and forms a part of the bolt B, and the projection P is a part of the main casting A, so that by the action of the said wedge upon P, as the bolt is drawn upon by the nut, the double purpose is accomplished, by means of a single nut and bolt, of securing the valve-seat firmly in position, and also of tightening the cap C. In order, therefore, to examine the valve it is only necessary to unscrew the nut on B and remove the cap. In order further to remove the valve-seat containing the valve, it is only necessary to knock out the wedge W, when the said valve-seat may be slid out, and a new one, if required, may be slid in to replace it.

In Fig. 3 the toggle-joint T is employed as the equivalent for and in place of the wedge W in connection with the bolt B.

Other modifications of the device employed may be readily suggested, all, however, without affecting the character of the invention.

What I claim as my invention, and desire to secure by Letters Patent of the United States, is—

1. The combination of the projection or bearing P with the wedge W, bolt B, and cap C, substantially in the manner and for the purposes described.

2. The combination of the said wedge W with the valve V, substantially in the manner and for the purposes described.

WILLIAM WATTS.

Witnesses:
 DANIEL F. TOMPKINS,
 SARAH L. TOMPKINS.